(12) United States Patent
McAndrews et al.

(10) Patent No.: US 7,549,027 B1
(45) Date of Patent: *Jun. 16, 2009

(54) SYSTEM AND METHOD FOR MANAGING REPLICATION OF DATA IN A DATA STORAGE ENVIRONMENT

(75) Inventors: Gerard McAndrews, Lancaster, MA (US); Michael J. Cody, Wellesley, MA (US); Brian Joseph Gardner, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 538 days.

This patent is subject to a terminal disclaimer.

(21) Appl. No.: 10/883,451

(22) Filed: Jul. 1, 2004

(51) Int. Cl.
*G06F 1/00* (2006.01)
(52) U.S. Cl. .......................... 711/161; 714/16; 707/202
(58) Field of Classification Search .................. 711/161; 714/16; 707/202
See application file for complete search history.

(56) References Cited

U.S. PATENT DOCUMENTS

2004/0139128 A1* 7/2004 Becker et al. ............... 707/204

OTHER PUBLICATIONS

Andrew S. Tanenbaum, Structured Computer Organization, 1984, Prentice-Hall Inc., second edition, pp. 10-12.*
Romero et al., Oracle Database Backup and Recovery Basics 10g, Dec. 2003 [online], Oracle Corporation, Release 1 (10.1), retreived from internet Oct. 17, 2007 [url: http://download-east.oracle.com/docs/cd/B14117_01/server.101/b10735/toc.htm], chapters 1 and 2.*

* cited by examiner

*Primary Examiner*—Kevin L Ellis
*Assistant Examiner*—Jared I Rutz
(74) *Attorney, Agent, or Firm*—Krishnendu Gupta; Joseph D'Angelo

(57) ABSTRACT

This invention is a system and method for backup and recovery of data using a new architecture that includes continuous backup and information protection backup and recovery system components.

20 Claims, 10 Drawing Sheets

TIME-ORDERED STORAGE ON JNL

WRITE 1
WRITE 2
.
.
.
WRITE 5        (RECOVERY POINT)
.
.
.
.
WRITE 9        (RECOVERY POINT)
.
.
.
.
WRITE 12       (RECOVERY POINT)
WRITE 13

FIG. 4

SYSTEM AND METHOD FOR MANAGING REPLICATION OF DATA IN A DATA STORAGE ENVIRONMENT

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending patent application Ser. No. 10/882,843, by the same inventive entity as this application and entitled "Computer Architecture for Managing Replication of Data in a Data Storage Environment" and is assigned to EMC Corporation the assignee of this application.

FIELD OF THE INVENTION

The invention relates generally to managing data in a data storage environment, and more particularly to a system and method for managing replication of data distributed over one or more computer systems.

BACKGROUND OF THE INVENTION

As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. To minimize the chance of data loss, the computer systems also can include a backup storage system in communication with the primary processor and the data storage system. Often the connection between the one or more processors and the backup storage system is through a network in which case the processor is sometimes referred to as a "backup client."

The backup storage system can include a backup storage device (such as tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

Customers continue to struggle with providing the appropriate protection to their business applications. Backup is typically the name of the tool providing the protection, however, recovery and restore of applications may be the more important consideration. Backups may take very long times and provide points in time where the recovery can occur that are limited by the amount of time required for backup. Further steps are taken to complete the restore.

These processes may take hours or days before the customer is able to restore the application. Unfortunately in a modern global business climate with 24/7 internet commerce, recent studies indicate businesses cannot tolerate such long times for recovery. Instead there is almost no tolerance for application downtime. And there's another downside to doing the backups needed for restoration: Backup's can have a heavy impact on application servers, often the very ones needed to support the heart of the business applications. Moving large volumes of date at high speed for backup is CPU and I/O intensive.

Recovery requirements are becoming increasingly stringent. At one time a recovery window of 24 to 48 hours was considered reasonable for mission critical information, but this tolerance has shrunk to about an hour. Backups are expensive in terms of resources and congestion on application servers, creating a problem that only grows in complexity as the volume of information increases with geometric growth.

What is needed is a way to meet the demands of recovery described above without increasing requiring more backup operations and while not congesting traffic on application servers needed for business.

SUMMARY OF THE INVENTION

In order to overcome the problems described above and to provide advantages described herein, the present invention is a system and method for continuous backup combined with an information protection application for backup and recovery. A system and method for backup and recovery of data using an architecture that includes continuous backup capabilities combined with an information protection backup and recovery components.

BRIEF DESCRIPTION OF THE DRAWINGS

The above and further advantages of the present invention may be better understood by referring to the following description taken into conjunction with the accompanying drawings in which:

FIG. 4 also shows time-ordered storage useful for methods of using the architecture of FIG. 3;

DETAILED DESCRIPTION OF THE PREFERRED EMBODIMENT

The methods and apparatus of the present invention are intended for use with data storage systems, such as the Symmetrix Integrated Cache Disk Array system or the Clariion data storage system, wherein each is available from EMC Corporation of Hopkinton, Mass. Also the methods and apparatus of this invention are useful with a backup and recovery system, such as The EMC Data Manager (EDM) is capable of such backup and restore over a network, as described in numerous publications available from EMC of Hopkinton, Mass., including the EDM User Guide (Network) "Basic EDM Product Manual". Such a system is described in U.S. Pat. No. 6,047,294, assigned to assignee of the present invention, and entitled Logical Restore from a Physical Backup in Computer Storage System and herein incorporated by reference.

The methods and apparatus of this invention may also be used with a backup and recovery system provided by Legato Corporation an EMC division. Legato also has a product Legato Networker that includes a software portion called PowerSnap that is useful for certain aspects of operation of an embodiment of this invention.

Figure 10:
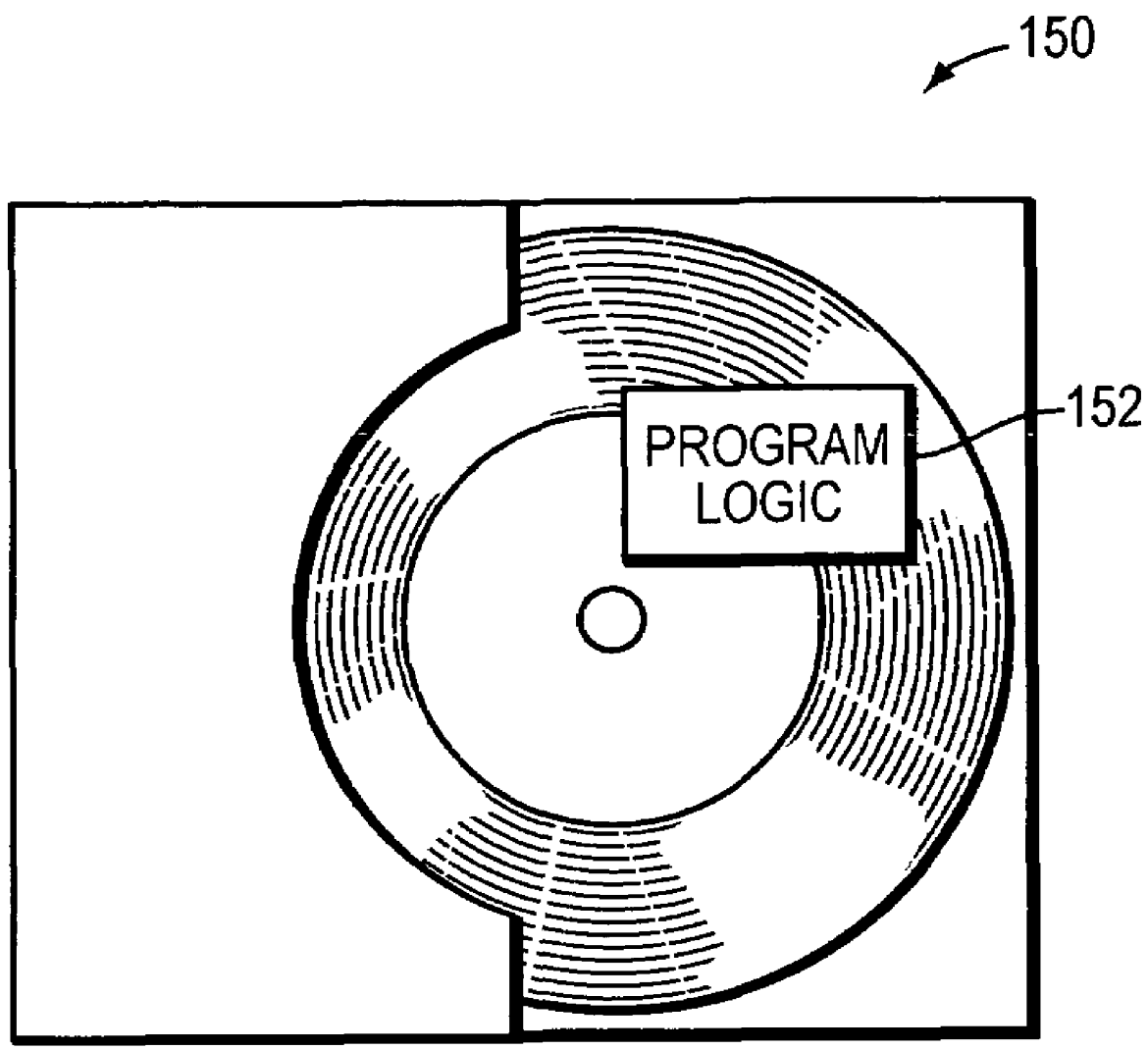
FIG. 10 shows a computer-readable medium including computer-executable code including program logic for carrying out method steps of the method embodiments of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. FIG. 10 shows a computer-readable medium 150 including program logic or program code 152 which may be executed by a computer to carry out method steps for implementing method steps of an embodiment of this invention as is described herein.

In order to better understand the invention, some fundamentals of backup and recovery are covered now. The process of protecting the information can be very complex. It is made even more complex when consideration is given to recovery. If rapid recovery is desired, there more than likely is a backup to a disk copy. The disk copy can be used for the rapid recovery. Ultimately, the data is placed on low cost tape for long term storage.

Figure 1:
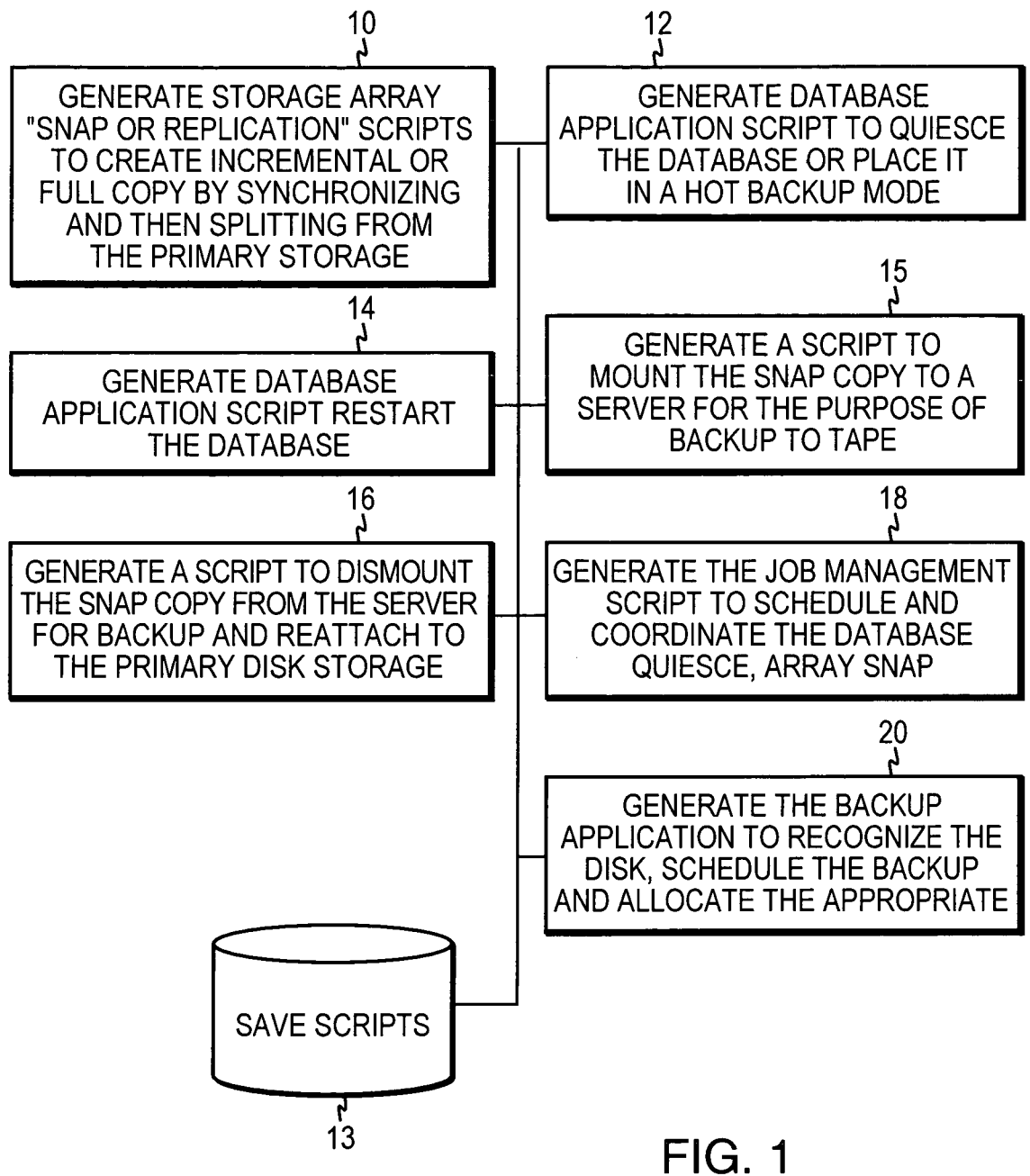
FIG. 1 shows a prior art method for backup and recovery.
Figure 2:
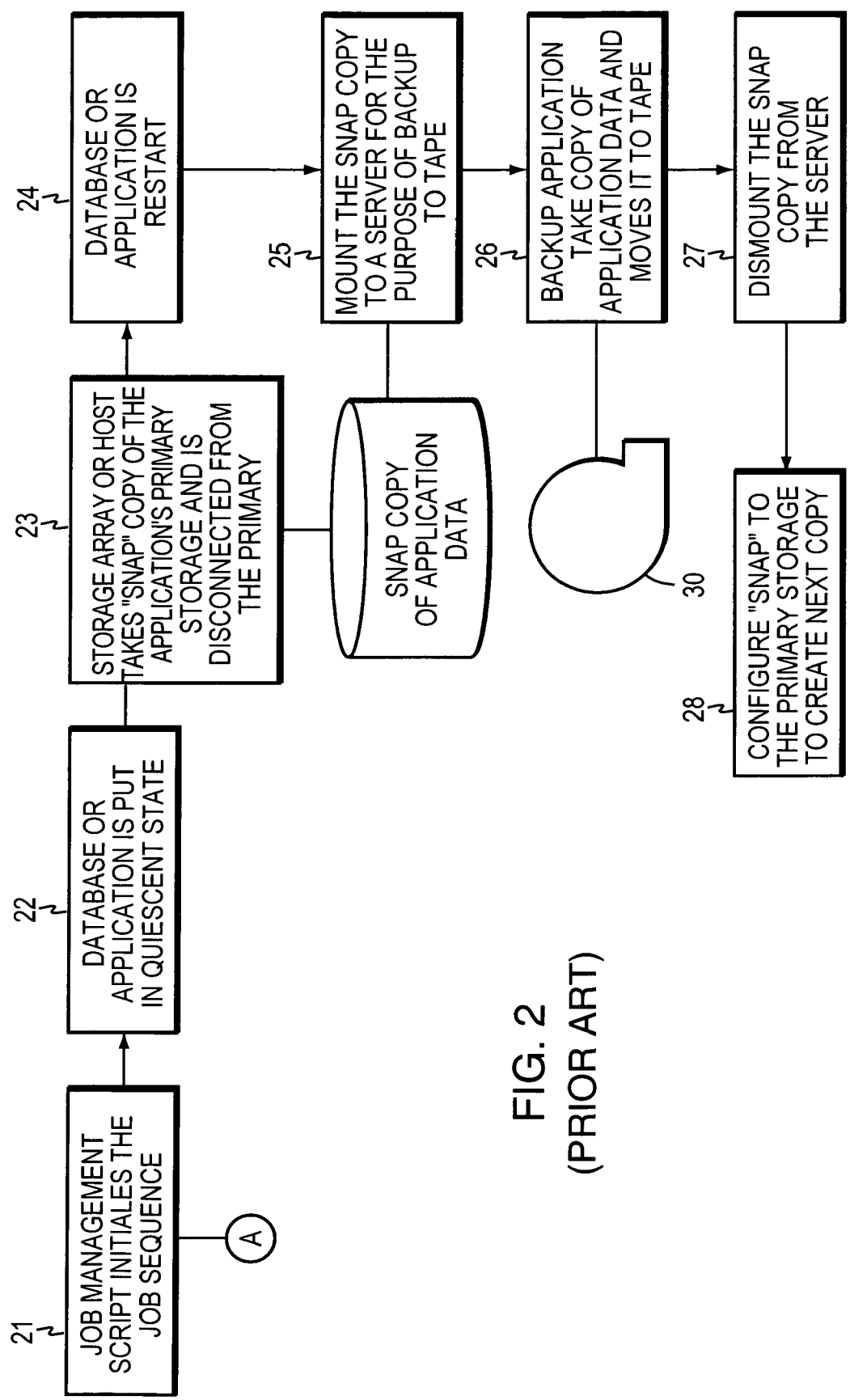
FIG. 2 shows more of a prior art method for backup and recovery.

Prior art solutions have been available that cover narrow sections of the overall process, and reference is made to FIGS. 1 and 2 that discuss such. These narrow sections are replication, backup/recovery to disk and or backup/recovery to tape. A full end-to-end solution covering comprehensively all of these sections and with continuous backup (discussed below) has not existed without the prior invention. The following sections cover the process of backup to disk then to tape as well as recovery. Recovery may be from disk or tape.

The process to create a backup to disk then eventually to tape is complex. This invention is particularly useful with regard to a case within backup to disk that is commonly called a snapshot. It involves many steps and requires knowledge and skills with replication (storage array or host based), applications, operating systems and the backup applications. Setting up the process is difficult and is not flexible without the present invention.

With prior art solutions, a user had to have knowledge of the array specific application programming interface or command line interface to create the snapshot or snap (SNAP) copies on disk. There are many steps that include assigning the SNAP at time of configuration to performing the copy and disconnect from the primary storage operations. Limitations exist as to how many copies of the primary as well as total number of copies from a disk subsystem.

Alternatively, there are host based replication products available that may be used in lieu of the storage array based replication. Again the user needs to have specific knowledge of the programming interface of the host based replication product. Configuration would be required as well as the appropriate operations to copy from the primary and then disconnect.

In order to get a consistent backup, the application must be stopped. This allows for the data in the server cache to be flushed while not allowing any new transaction to occur until a full valid copy is made at that specific point in time. This process step enables the creation of a re-startable point in time copy. The application must be returned to its normal state after the re-startable copy is taken. A script kicks off the process of restarting the application. Any pending transaction is now applied and normal processing is occurring.

In order to get a copy to tape, a backup operation must occur. The SNAP copy that is on the array must be mounted to a server where an information protection (backup) application can perform the task of creating a copy on tape. A script can be used to mount the SNAP copy onto a server.

The backup application must be configured to perform the task of information protection. The server to be backed up is identified, the tape or tape library resources are allocated and the task is scheduled or initiated. This task may be scripted or use the automation provided by the backup application.

After the backup has occurred, the SNAP must be dismounted. Dismounting makes the SNAP available to capture the next copy. A script is written to perform this task. The SNAP may be reused to create the next copy. A script is written to configure the SNAP to take the next copy. Any changes to the configuration due to normal growth or shrinkage of the application may require changes in any or all the steps above.

All of these actions described above are associated with the planning and preparation stage of conducting snapshot backup or recovery, in a preferred embodiment. Each script that is created is typically unique to the application, file system and disk storage array. Each requires knowledge of those specific programming interfaces.

Referring to FIG. 1, a general overview of an example of a prior art implementation of manually generating backup to disk to tape is now given. In step 10 scripts are written to create SNAPs or replication on a storage array to create incremental or full copy by synchronizing the copy to the primary and then splitting from the primary storage. In step 12, a database application script needs to be written to quiesce (stop Input/Output transactions a database), alternately this could be a script to stop a file system to be backed up or place the database in hot backup mode. The database or file system needs to be restarted, a script to accomplish this task is shown in step 14. In order to accomplish the information protection task, step 15 shows that a user may next generate a script to mount the SNAP copy to a server to perform the information protection program (backup). The reverse of that script is required as shown in step 16, wherein the user generates a script to dismount the SNAP copy so that the process may be repeated by reattaching the disk to the primary storage device. Scheduling or coordinating all the activities to occur in the proper sequence is accomplished by generating another script as shown in step 18. The scheduler invokes all of the other scripts saved in step 13 in the proper sequence of operations as described in FIG. 2. As configurations change, the scripts need to be modified or rewritten. Next in step 20, the user may configure the backup application to recognize the disk, schedule the backup and allocate appropriate tape resources.

Referring to FIG. 2, the general overview of an example of a prior art implementation of manually generated backup to disk to tape is given. In step 21, the job scheduler invokes the scripts to accomplish the backup operation. The database application is put into a quiescent state in step 22. A copy of the data is made in step 23. After the copy to disk is complete, the database is restarted, step 24, to continue normal transaction processing. In order for the backup to occur, the SNAP copy needs to be mounted to a server, accomplished in step 25. The backup application performs its function in step 26. After the backup completed, the SNAP is dismounted, step 27, and reattached to the primary storage device, step 28. The backup data from these operation may be used for restore and recovery.

Figure 3:
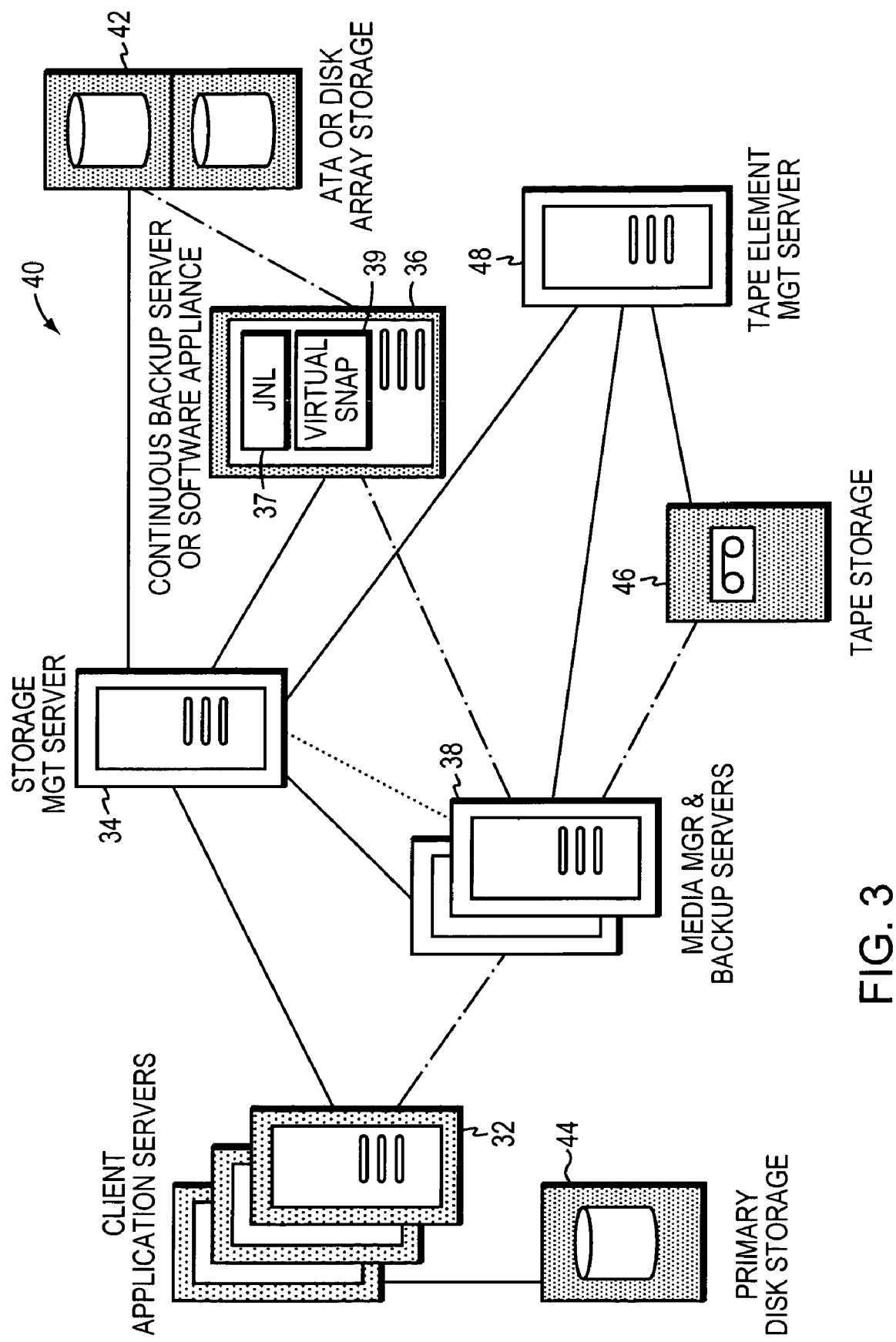
FIG. 3 shows a new architecture for backup and recovery including continuous backup.

FIG. 3 shows a new architecture providing advantages over prior art systems and methods. This new architecture 40 incorporates continuous backup technology with a backup and recovery information protection system to create virtual snapshot capabilities for storage devices such as ATA drives (ATA denotes the popular AT Attachment (ATA) storage interface utilized as the disk drive interface on many personal and mobile computers today) or disk storage array drives 42. This is an advantage when that feature is absent or not available with the ATA drives or the storage array drives. Even if snapshot capability is present with the storage array the new architecture may yield a much higher frequency snapshot than the ATA or storage array drives are capable of delivering by integrating a continuous backup feature with a standard information protection (backup and recovery) application.

A problem with known continuous backup technologies is their inability to manage the application, especially applications that may be federated. That is applications that span many servers and run different programs. In order to back up federated applications, there is a need to be able to quiesce applications, such as databases together so that a consistent point in time copy is created. The new architecture shown in FIG. 3 overcomes this problem. This new architecture incorporates continuous backup in the form a continuous backup server or software appliance denominated herein also as a continuous backup appliance (CBA) 36 including a journal (JNL) 37 for storing time ordered writes (discussed below with reference to FIG. 4) and a capability for creating virtual SNAPs 39 using the time-ordered writes.

In this architecture, in one embodiment, software is provided to merge all the tasks required to perform backup and recovery into a single package. Software may be pre-configured to run on a particular hardware platform or it may be software that runs on many server platforms. Two major components comprise the software appliance: continuous backup capability and an information protection (backup/recovery) application.

Referring again to FIG. 3, the new architecture incorporates with the continuous backup appliance 36 and the storage drives 42, tape storage 46, tape element management server 48, and backup servers 38, and client application servers 32 with primary disk storage 44 are served by the other elements. Optionally, the architecture may be monitored by a storage management server 34 and there may be a media manager included with the backup server 38 for the tape libraries. The backup and recovery components and storage management servers in a preferred embodiment are available from EMC and may include EMC's EDM components and/or EMC's Legato components, and if Legato components then Networker software with PowerSnap software is preferred for managing the virtual SNAPs 39. The time-ordered writes capability is known but has not been incorporated in the prior art into an architecture as shown in FIG. 3.

Referring to FIG. 4, the continuous backup product is used to provide time ordered storage. All writes to the primary applications are sent off to the log or high speed journal 37 (FIGS. 3 and 4). These time-ordered writes, shown in the example as being write 1-13 are used to create incremental point in time backups or provide various time ordered points to roll back applications for the purpose of recovery from hardware faults, human error or program-related problems. For example, as shown, recovery points can be created at data points consistent with writes 5, 9, and 12.

Figure 5:
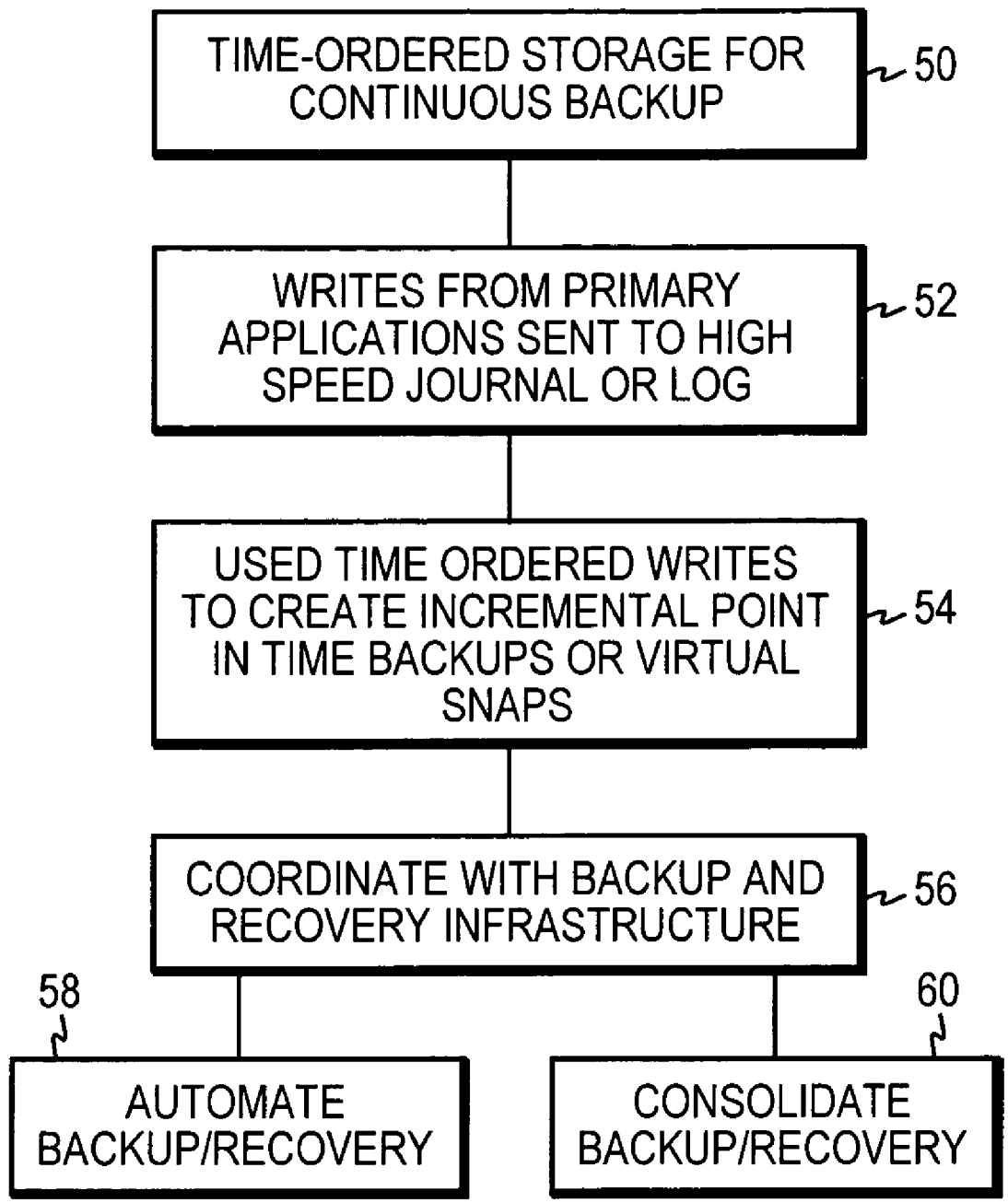
FIG. 5 shows a method of using the architecture of FIG. 3.

A preferred overview of a method of using the architecture of FIG. 3 is shown in FIG. 5. Time-ordered writes are sent to storage for continuous backup in step 50. Writes from the primary applications are sent to both the primary storage and the high speed logs or journal in step 52. The time-ordered writes are used to create incremental point in time backups or virtual SNAPs in step 54. Information from the continuous backup appliance is sent to the catalog function of the information protection application to manage the virtual SNAP copies as the re-startable point in time copies. The continuous backup appliance is coordinated in the new architecture for backup and recovery in step 56. A re-startable point in time virtual SNAP will work in concert with the continuous backup appliance for recovery purposes. A re-startable point in time copy is selected such as write 12 from FIG. 4. Automation and consolidation of backup and recovery are thus made possible with the new architecture in steps 58 and 60, respectively.

As has been discussed briefly above, information protection is available with the architecture of FIG. 3 in combination with the continuous backup to coordinate the client application quiescent state. A client application is any application which uses the backup and recovery services provided by the information protection application to get consistent point in time copy and illustrated on the client application servers 32. Other services include, but are not limited to: provide application association through the catalog, create full recover images from incremental data, archive the backups to tape, and set the policies for expiration of old data. Thus enabling customer to automate and consolidate backup and recovery data sets and have the capabilities offered by time-ordered continuous storage of writes including virtual snapshots of relatively high-frequency.

The approach to continuous backup is out of the primary data path reducing any load to primary client application server 32. Automation eliminates the customers need to know of any specifics of snapshot technology. Features of the existing backup application are used to create backup and perform recovery. This approach takes a very complex, high application environment impact, process requiring much domain specific knowledge in the prior art and provides it as an automated, low impact process requiring little to no domain specific knowledge.

Figure 6:
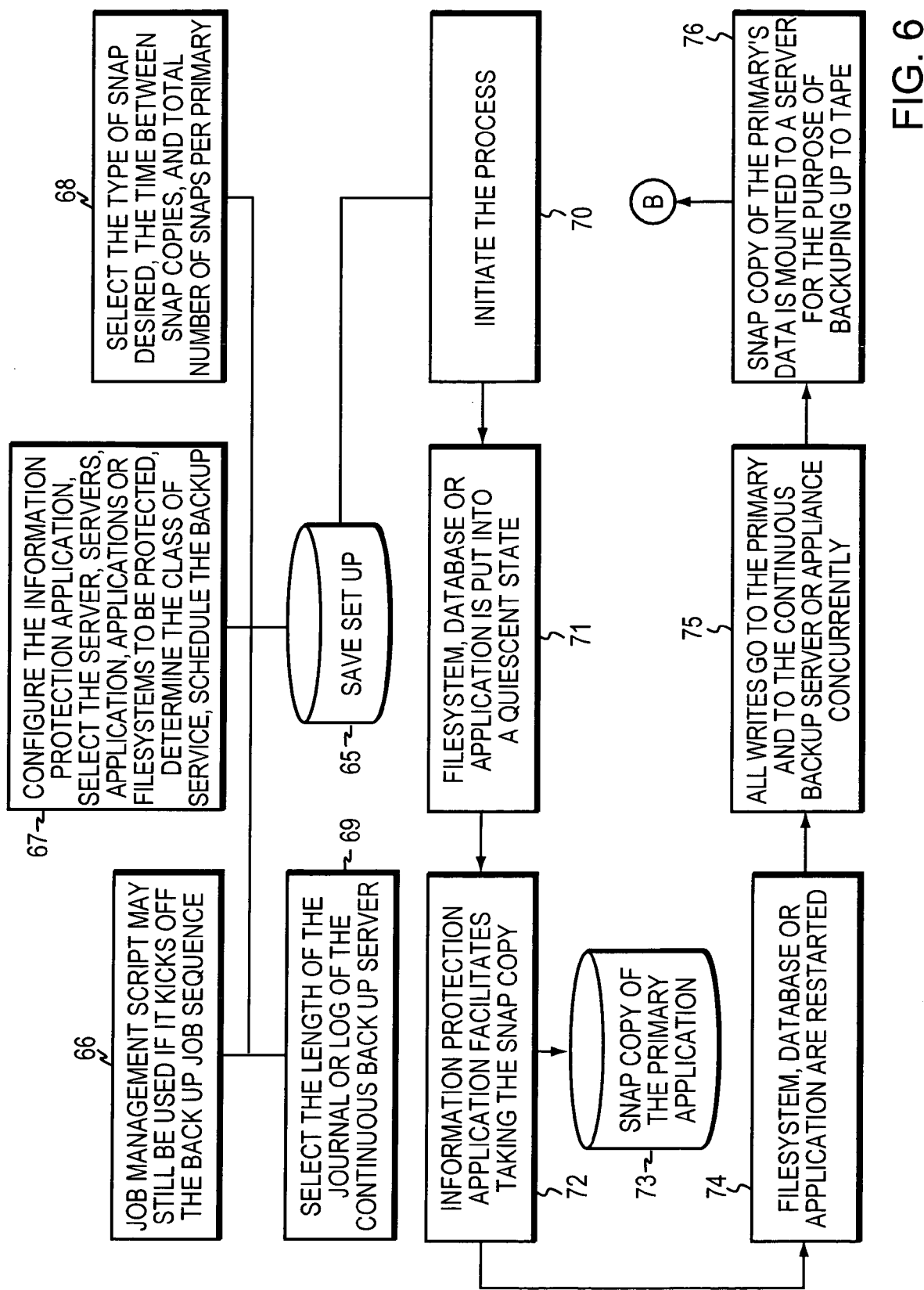
FIG. 6 also shows a method of using the architecture of FIG. 3.
Figure 7:
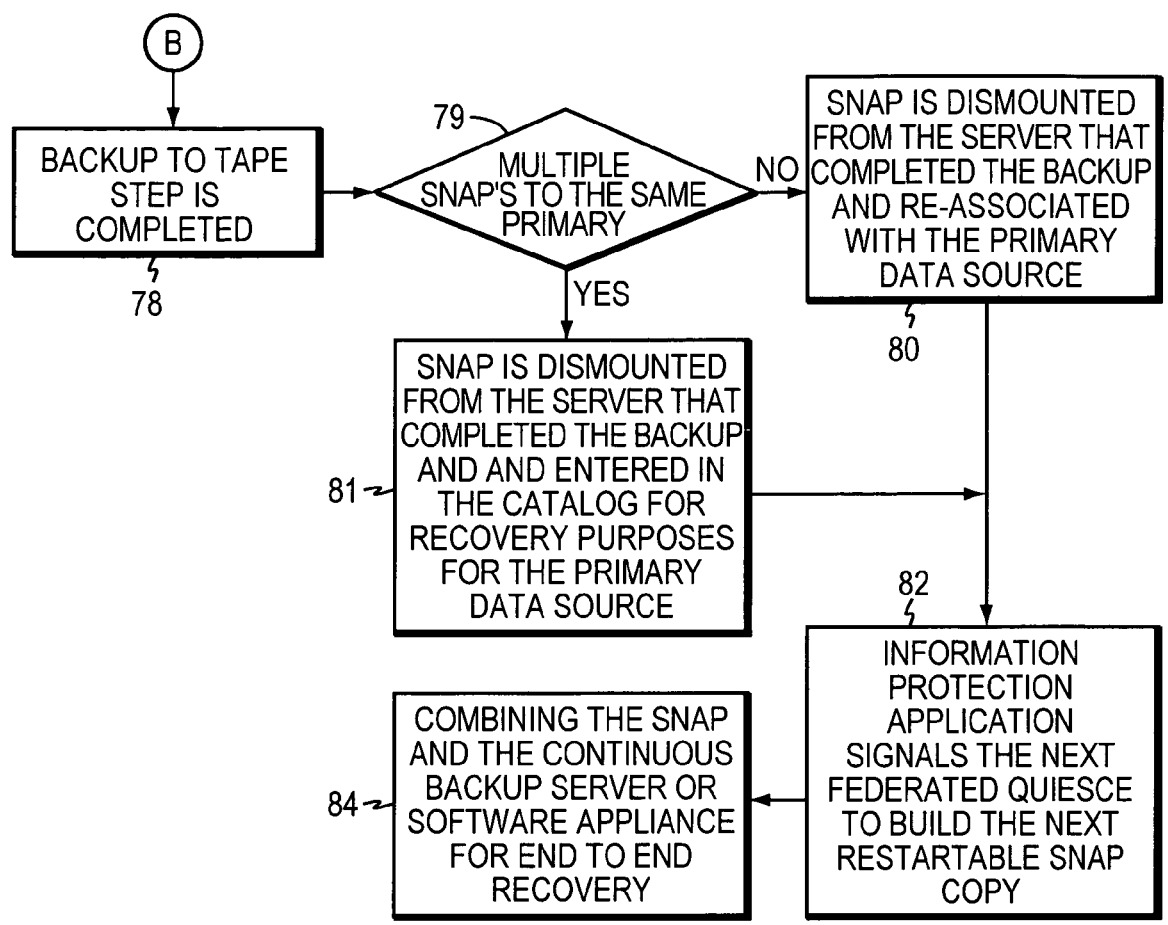
FIG. 7 also shows a method of using the architecture of FIG. 3.

FIGS. 6 and 7 show how the new architecture may be used for backup of disk to tape and including coordinating with continuous backup data or virtual SNAPs from time-ordered storage. The predefined job management script may still be required to initiate the required tasks to accomplish a backup to disk to tape in step 66 or the new architecture handles all steps required to handle backup to disk, backup to tape, recovery from disk or recovery from tape. The new architecture can be configured to backup and recover simple application, file systems or data bases. The same architecture handles complex configurations of multiple applications, multiple file systems and multiple servers, in step 67. The setup is saved in step 65. The ability to configure and manage these federated applications is important when considering recovery. In order to be able to restart, all applications that are working together must be able to be coordinated to the same point in time. The new architecture provides the coordination with the ability to recover and restore from both SNAP copies and or a journal log.

Step 68 allows the user to select the type of disk based protection desired. Protection can be in the form of: full copy of the primary data or a copy of the data that has changed from the last time a SNAP was taken (incremental copy). Flexibility is provided in that the user may select storage array based SNAP, server based SNAP copies or the Virtual SNAP capability provided by the Continuous Backup Appliance.

Time to discover a defect is an important consideration for the user. Their ability to detect latent defects determines how far back in time SNAP copies should be kept for recovery purposes. For example, if the defect is discovered in 6 hours, they may want to keep two versions: (1) six hours old and the (2) a second that is twelve hours old.

The next consideration is the time available to recover. If the time is very short, more frequent SNAP's may be required. Longer recovery windows allow for fewer SNAP's. These considerations affect the Service Level that an Information Technology group provides. Cost is also another factor. Adding continuous backup needs to consider both the time to find a defect as well as the recovery window. The log of all writes will be sized around the service level requirement. The new architecture factors defect detection and recovery time. The set up information is shown in step 69.

The process of information protection is initiated after the set up has been determined as shown in step 70. The new architecture places the file system, application or database in a quiescent state. All data in the server I/O or cache is written to the primary storage array, in addition writes occur to the continuous back up appliance and or to the SNAP capability of the storage array or server depending on the user configure, in step 72. These copies are now synchronized to the primary for the point in time that the quiesce state occurred. In the case that the user selected continuous data protection, virtual SNAP(s) are marked in the journaled log to indicate re-startable points in time. These restarted points in time are stored on hard disks as part of the storage array or the continuous backup appliance, shown in step 73. After the SNAP copy has been taken and completed, the primary application must be restarted or taken out of a back mode. The new architecture facilitates this operation in step 74.

Normal operation occurs by having writes going to the primary storage array and a concurrent copy of each write going to the continuous backup appliance's log, in step 75. This starts the sequence of protecting the next version. The log will be used to restore to the current point in time. The SNAP copy is used to create a restartable point in time recovery object. The journaled log contains all write transactions that have occurred since the recovery object that are to be reapplied, without the defect, to get to the current state. The SNAP copy can now be protected by writing a copy to tape. The SNAP is mounted to a server and made operational to that server, step 76. Connecting step "B" shows the flow of steps of FIG. 6 into FIG. 7.

Referring to FIG. 7, to get this disk data to tape, a backup operation occurs on the server where the SNAP copy is written to tape in step 78. The new architecture manages the backup functions of moving the data to tape in this step 78. Once complete, the SNAP copy should be dismounted from the server that the backup operation occurred on so that the SNAP is available for the next point in time copy of the primary storage in step or there may be multiple SNAPs of the primary data. A decision is made in step 79, whether there are single copies or multiples. If there is one SNAP, in step 80, the SNAP is configured to primary storage to create a next copy. If multiple copies of the primary are being taken, the various versions of the SNAP copies are cataloged for use in recovery, step 81. The SNAP that is no longer needed is retired and reconnected to the primary to be synchronized to the current data. The architecture signals the next occurrence of the backup in step 82. Generally this capability is combined with the continuous backup server or software appliance 36 for so-called end-to-end recovery including high frequency virtual SNAPs from continuous backup shown in step 84.

Figure 8:
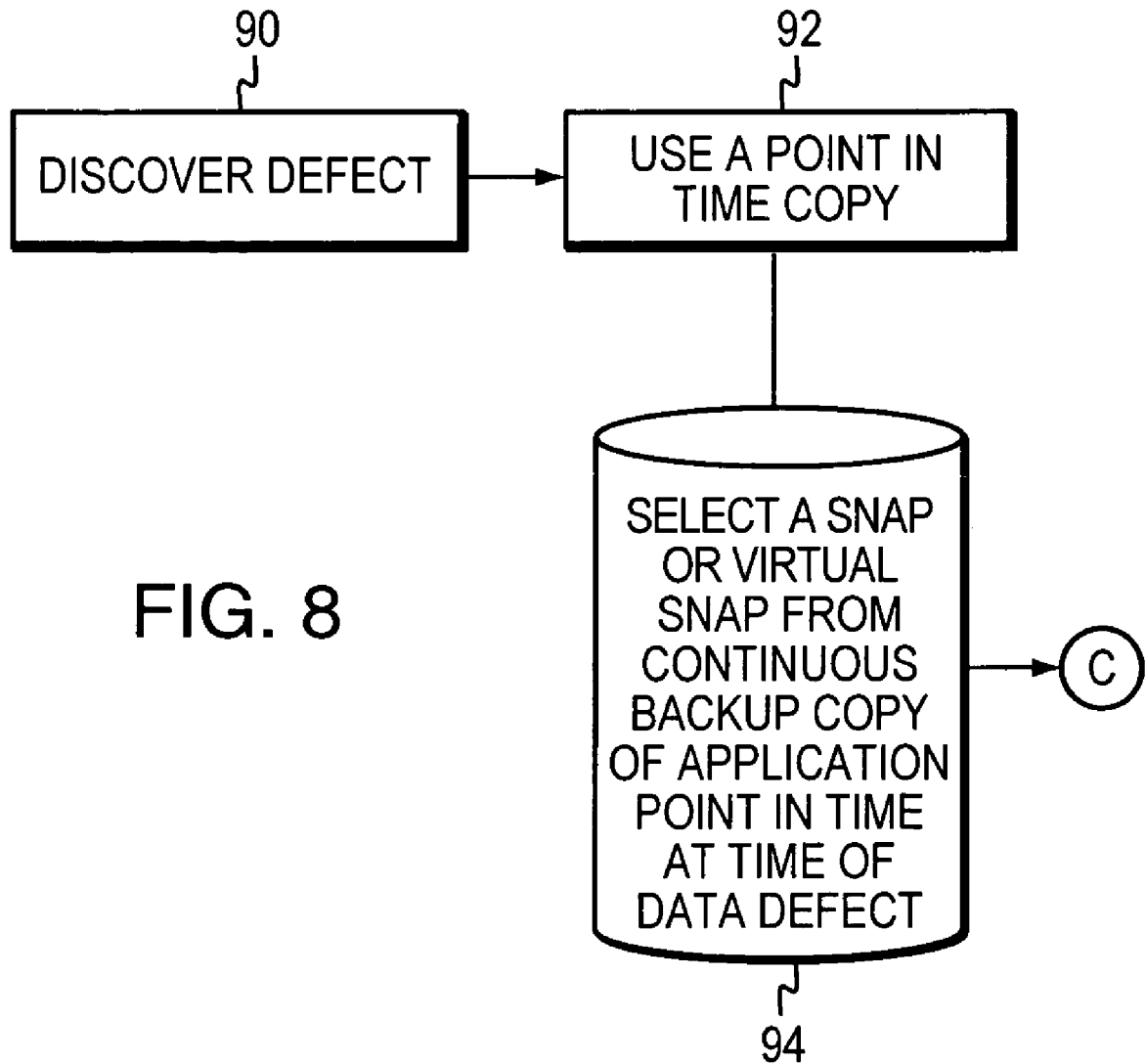
FIG. 8 also shows a method of using the architecture of FIG. 3.
Figure 9:
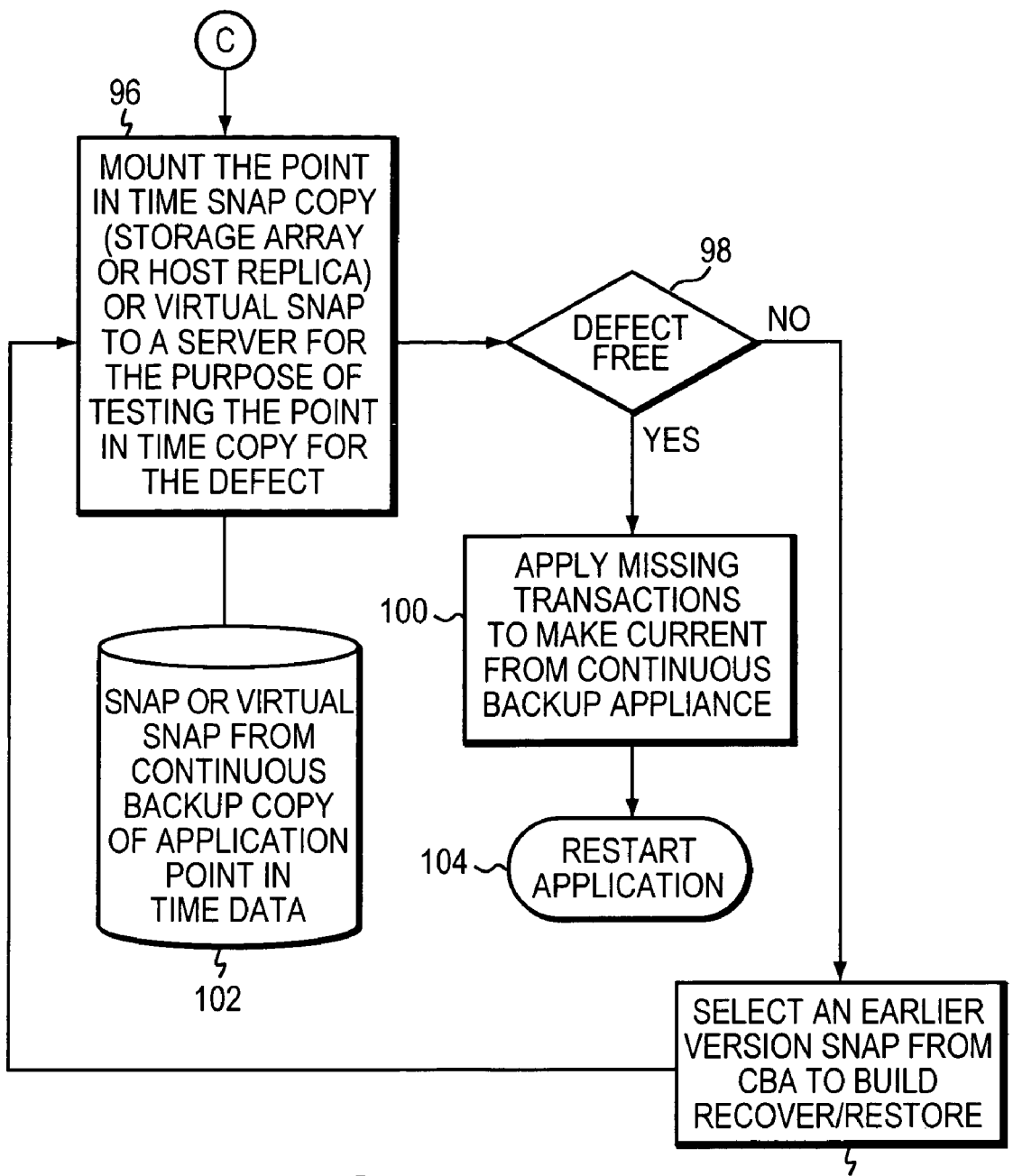
FIG. 9 also shows a method of using the architecture of FIG. 3.

FIGS. 8 and 9 show how the new architecture may be used for recovery. Recovery is now generally discussed. Recovery is a process that has many variables. Economic or job-related pressure typically exists to get the application back as quickly as possible. Techniques of surgical repair of certain transactions to full restore from tape may be employed. A few examples of practices are offered below. Rapid recovery is the process that uses disk based replicas to bring back the application quickly to a point in time.

An example of use of the new architecture for recovery is now described with reference to FIGS. 8 and 9. In step 90 in the example case, a defect is found, in order to eliminate the defect it is determined that a recovery to a point in time before the defect existed is the approach, and such a point in time copy is used in step 92. In general, one of the first tasks that is performed in a normal recovery operation is to get a current copy of the application. It is taken at the time where the defect is found as shown in step 94. If various recovery techniques that are being applied eventually fail, the application can be brought back to the state where the defect was discovered. Continuation step C shows logic flow from FIG. 8 to FIG. 9.

Referring to FIG. 9, a storage array or host based replica or virtual SNAP is mounted to the application server as shown in step 96, and the SNAP or virtual SNAP from the continuous backup copy of application point in time is shown as a resource 102 for completing that SNAP. This is a fast recovery method in that data didn't need to be moved. Once mounted the application is tested to determine if there is an absence of the defect as shown in step 98. If YES, an application of missing transactions is made from the continuous backup appliance (CBA) or the application's transaction logs in step 100 and the application is restarted in the recovered mode in step 104. In other words, when it is determined that the defect is no longer in existence at the earlier point in time copy, transactions that occurred between that earlier time and the current time can be reapplied, as shown in step 100. If on the other hand, a defect is present (answer NO) then in step 97 an earlier version SNAP from the CBA is selected to build data for a recover or restore operation, and steps 96 through 98 are repeated until there is no defect, and finally the application is restarted in step 104.

A system, method, and new architecture has been described for backup and recovery of data using a new architecture that includes continuous backup and information protection backup and recovery system components. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for backup and recovery of data using an architecture that includes continuous backup capabilities combined with an information protection backup and recovery components including a backup server and backup media, the method comprising the computer-executed steps of:
   storing a snapshot of the data, according to a known time to discover a defect, used by a client application server in the backup media, the snapshot comprising a re-startable point in time recovery object;
   creating continuous virtual snapshots of the data from the client application server by storing, in a time synchronized manner, incremental writes to the data on the backup media in a continuous data journal log according to a known time to discover a defect;
   identifying recovery points in the journal log as selected ones of the continuous virtual snapshots of the data; and
   in response to a request to recover the data to a recovery point in time, applying the incremental writes in the continuous data journal log up to the recovery point associated with the recovery point in time to the snapshot for recovery of data from the client application server.

2. The method of claim 1, wherein all I/O writes for logical volume of data representing data on the client application server are written to the journal log and saved on the journal log in time-ordered fashion, wherein the time-ordered journal log may be used for a roll back of an application for a recovery or restore operation.

3. The method of claim 2, wherein the information protection components are used to coordinate the client application in a quiescent state to get a consistent point in time copy.

4. The method of claim 2, wherein the selective use of the backup data or the recovery points in the journal log uses only the recovery points for a rollback of the client application.

5. The method of claim 2, wherein the selective use of the backup data or the recovery points in the journal log uses a combination of the backup data and the recovery points for a rollback of the client application.

6. The method of claim 2, wherein policies for expiration of old data being archived to backup media are controlled by the backup server.

7. The method of claim 1, wherein the information protection components are used to coordinate the client application in a quiescent state to get a consistent point in time copy.

8. The method of claim 1, wherein the selective use of the backup data or the recovery points in the journal log uses only the recovery points for a rollback of the client application.

9. The method of claim 1, wherein the selective use of the backup data or the recovery points in the journal log uses a combination of the backup data and the recovery points for a rollback of the client application.

10. The method of claim 1, wherein policies for expiration of old data being archived to backup media are controlled by the backup server.

11. A program product for backup and recovery of data using an architecture that includes continuous backup capabilities combined with an information protection backup and recovery components including a backup server and backup media, the program product comprising a computer-readable medium in communication with the backup server wherein the medium is encoded for enabling the computer-executed steps of:
    storing a snapshot of the data, according to a known time to discover a defect, used by a client application server on the backup media, the snapshot comprising a re-startable point in time recovery object;
    creating continuous virtual snapshots of the data from the client application server by storing, in a time synchronized manner, incremental writes to the data in a continuous data journal log on the backup media according to a known time to discover a defect;
    creating recovery points in the journal log as selected ones of the continuous virtual snapshots of the data; and
    in response to a request to recover the data to a selected point in time, applying the incremental writes in the continuous data journal log up to the recovery point associated with the recovery point in time to the snapshot for recovery of data from the client application server.

12. The program product of claim 11, wherein all I/O writes for logical volume of data representing data on the client application server are written to the journal log and saved on the journal log in time-ordered fashion, wherein the time-ordered journal log may be used for a roll back of an application for a recovery or restore operation.

13. The program product of claim 12, wherein the information protection components are used to coordinate the client application in a quiescent state to get a consistent point in time copy.

14. The program product of claim 12, wherein the selective use of the backup data or the recovery points in the journal log uses only the recovery points for a rollback of the client application.

15. The program product of claim 12, wherein the selective use of the backup data or the recovery points in the journal log uses a combination of the backup data and the recovery points for a rollback of the client application.

16. The program product of claim 12, wherein policies for expiration of old data being archived to backup media are controlled by the backup server.

17. The program product of claim 11, wherein the information protection components are used to coordinate the client application in a quiescent state to get a consistent point in time copy.

18. The program product of claim 11, wherein the selective use of the backup data or the recovery points in the journal log uses only the recovery points for a rollback of the client application.

19. The program product of claim 11, wherein the selective use of the backup data or the recovery points in the journal log uses a combination of the backup data and the recovery points for a rollback of the client application.

20. The program product of claim 11, wherein policies for expiration of old data being archived to backup media are controlled by the backup server.

* * * * *